United States Patent
Satyavolu

(10) Patent No.: US 10,196,069 B2
(45) Date of Patent: Feb. 5, 2019

(54) METHODS AND SYSTEMS OF ALGORITHMICALLY CONTROLLING AUTOMOTIVE FUNCTIONS

(71) Applicant: Surya Kiran Satyavolu, Novato, CA (US)

(72) Inventor: Surya Kiran Satyavolu, Novato, CA (US)

( * ) Notice: Subject to any disclaimer, the term of this patent is extended or adjusted under 35 U.S.C. 154(b) by 0 days.

(21) Appl. No.: 15/058,163

(22) Filed: Mar. 2, 2016

(65) Prior Publication Data

US 2017/0021839 A1    Jan. 26, 2017

Related U.S. Application Data

(60) Provisional application No. 62/127,120, filed on Mar. 2, 2015.

(51) Int. Cl.
*B60W 50/08* (2012.01)
*G06F 9/455* (2018.01)
*H04L 29/08* (2006.01)

(52) U.S. Cl.
CPC ....... *B60W 50/085* (2013.01); *G06F 9/45533* (2013.01); *G06F 9/45558* (2013.01); *G06F 2009/45566* (2013.01); *G06F 2009/45583* (2013.01); *H04L 67/12* (2013.01)

(58) Field of Classification Search
CPC .............. B60W 50/085; G06F 9/45558; G06F 9/45533; G06F 2009/45583; G06F 2009/45566
See application file for complete search history.

(56) References Cited

U.S. PATENT DOCUMENTS

| | | | | |
|---|---|---|---|---|
| 2006/0015231 | A1* | 1/2006 | Yoshimura et al. | B60W 30/00 701/48 |
| 2009/0319112 | A1* | 12/2009 | Fregene | B60W 30/16 701/23 |
| 2013/0159663 | A1* | 6/2013 | Levenglick | G06F 12/1036 711/206 |
| 2014/0303827 | A1* | 10/2014 | Doglov et al. | B60W 30/00 701/23 |

* cited by examiner

*Primary Examiner* — Dale W Hilgendorf

(57) ABSTRACT

In one aspect, a computerized system for controlling automotive functions of a vehicle, includes a multi-core system on chip; a hypervisor including a multi-core synchronization function for a plurality of cores on the system on chip; and a plurality of automotive function modules in communication with the plurality of cores through the hypervisor.

2 Claims, 9 Drawing Sheets

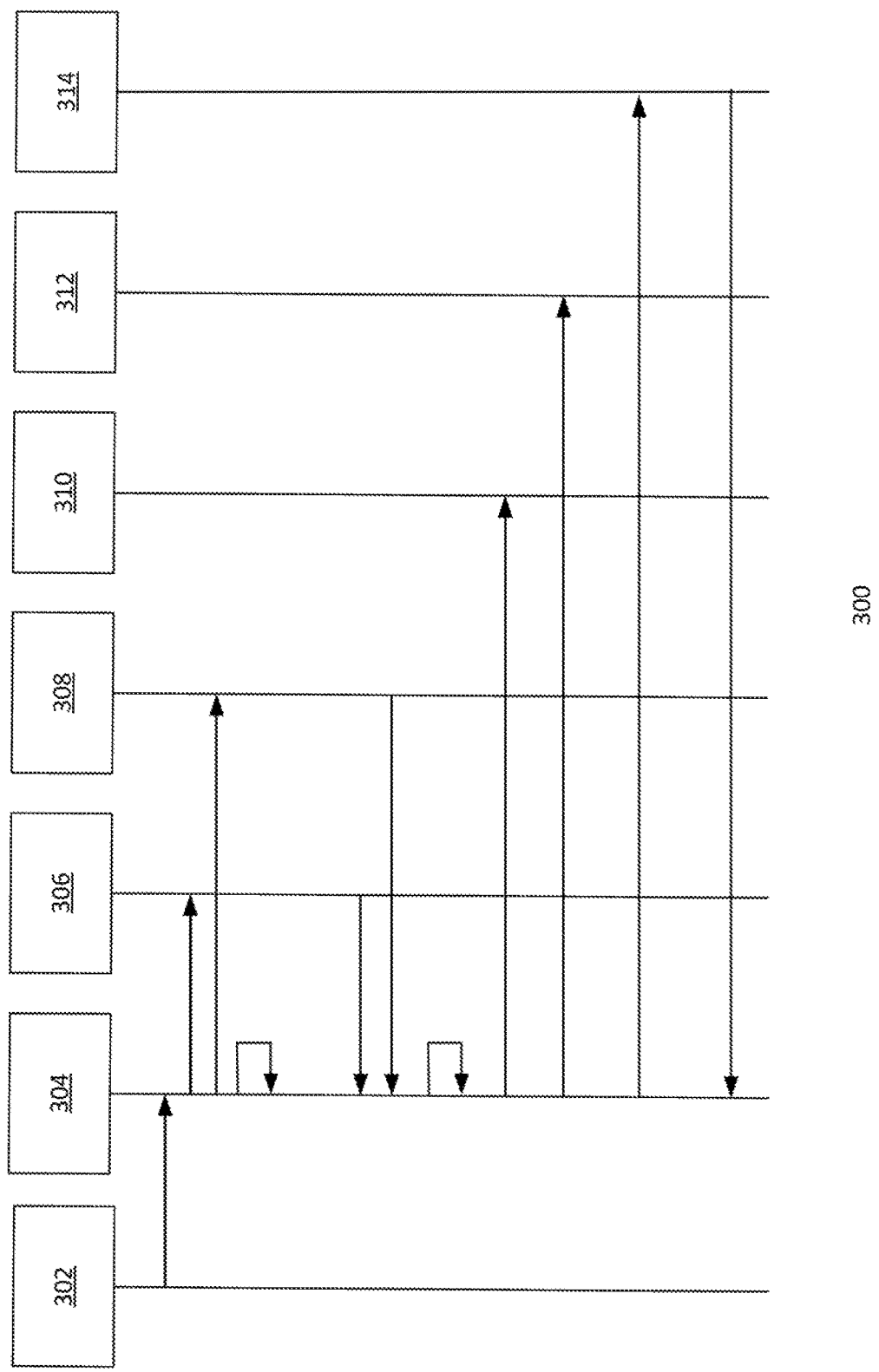

METHODS AND SYSTEMS OF ALGORITHMICALLY CONTROLLING AUTOMOTIVE FUNCTIONS

CROSS-REFERENCE TO RELATED APPLICATIONS

This application is a claims priority from provisional U.S. Application Provisional No. 62/127,120 filed Mar. 2, 2015. This application is hereby incorporated by reference in its entirety.

FIELD OF THE INVENTION

This application relates generally to automobiles, and more specifically to a system, article of manufacture and method of algorithmically controlling automotive functions.

DESCRIPTION OF THE RELATED ART

Automobiles currently available have a multitude of fixed function microcontroller units (MCUs) handling individual responsibilities. Systems available for fixed function MCU based control include for example, a brake controller for Anti-Lock Braking Systems, a Body-Controller MCU, and an Engine Controller MCU for Electronic Fuel Injection. Currently control is decentralized thereby limiting the capabilities in terms of drive-by-wire, autonomous driving or connected car technologies. Embodiments of the subject technology address this problem.

BRIEF SUMMARY OF THE INVENTION

In one aspect, a computerized system for controlling automotive functions of a vehicle, includes a multi-core system on chip; a hypervisor including a multi-core synchronization function for a plurality of cores on the system on chip; and a plurality of automotive function modules in communication with the plurality of cores through the hypervisor.

BRIEF DESCRIPTION OF THE DRAWINGS

FIG. 3 illustrates an example process for algorithmically controlling automotive functions, according to some embodiments.

Figure 1:
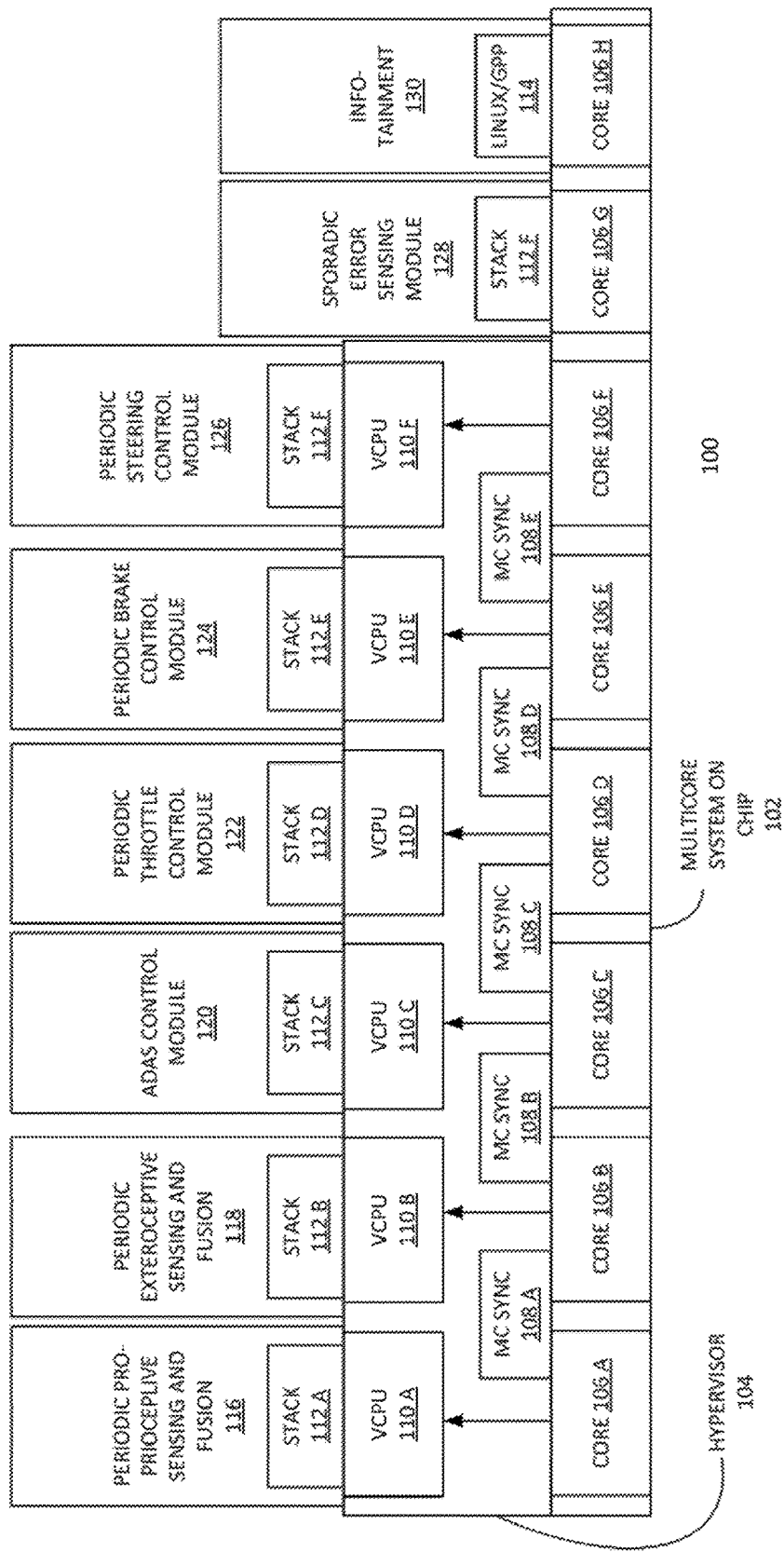
FIG. 1 illustrates an example system of an architecture for providing multi-function control in an automobile in accordance, according to some embodiments.

The Figures described above are a representative set, and are not an exhaustive with respect to embodying the invention.

DESCRIPTION

Disclosed are a system, method, and article of manufacture for algorithmically controlling automotive functions.

The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Aspects of the disclosed invention are described below with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor, such that the instructions, which execute via the processor, create means for implementing the functions/acts specified in the flowchart and/or block diagram block or blocks.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Advanced Driver Assistance Systems (ADAS) can be systems to help the driver in the driving process.

Avionics Application Standard Software Interface (ARINC 653) is a software specification for space and time partitioning in safety-critical avionics real-time operating systems (RTOS).

AUTOSAR (AUTomotive Open System ARchitecture) is a worldwide development partnership of automotive interested parties.

Exteroceptive can relate to stimuli that are external to an organism.

FlexRay is an automotive network communications protocol developed by the FlexRay Consortium to govern on-board automotive computing.

General Purpose Processor (GPP) can be a microprocessor optimized for a wide range of applications.

Hypervisor (or virtual machine monitor (VMM)) can be a piece of computer software, firmware or hardware that creates and runs virtual machines.

Infotainment can refer to a type of media which provides a combination of information and entertainment.

Kalman filtering (e.g. linear quadratic estimation (LQE) can be an algorithm that uses a series of measurements observed over time, containing statistical noise and other inaccuracies, and produces estimates of unknown variables that tend to be more precise than those based on a single measurement alone.

Kanade-Lucas-Tomasi (KLT) feature tracker can include an approach to feature extraction. KLT makes use of spatial intensity information to direct the search for the position that yields the best match.

Media Access Control (MAC) Layer can be responsible for moving data packets to and from one Network Interface Card (NIC) to another across a shared channel.

Media Oriented Systems Transport (MOST) can be an electronic bus type architecture for on-board audio-visual devices, primarily in automobiles.

Multi-core can be a type of microprocessor design in which multiple processors coexist on the same chip.

Proprioception is the sense of the relative position of neighboring parts of the body and strength of effort being employed in movement. Proprioception can relate to stimuli that are produced and perceived within an organism, especially those connected with the position and movement of the body.

Servo steering can be a steering system that reduces the strength required for steering. Two example types of servo steering include, by way of example, hydraulic servo steering, which provides the same level of support and electromechanical servo steering, which can come into effect if the driver needs it.

System on a chip or system on chip (SoC) can be an integrated circuit (IC) that integrates all components of a computer or other electronic system into a single chip. It may contain digital, analog, mixed-signal, and often radio-frequency functions-all on a single chip substrate.

Time-Triggered Controller Area Network (TTCAN) can be a vehicle bus standard designed to allow microcontrollers and devices to communicate with each other in applications without a host computer.

Virtual machine (VM) can be an emulation of a particular computer system. Virtual machines operate based on the computer architecture and functions of a real or hypothetical computer, and their implementations may involve specialized hardware, software, or a combination of the both.

Virtual CPU (VCPU) can be a virtual processor and a physical central processing unit (CPU) can be assigned to a VM.

Example Systems

An architecture for controlling automotive functions comprises a multi-core system on chip; a hypervisor including a multi-core synchronization function for a plurality of cores on the system on chip; and a plurality of automotive function modules in communication with the plurality of cores through the hypervisor.

Embodiments of the subject technology provide a centralized control module for synchronizing drive-by-wire commands, autonomous driving control, and/or connected automobile technologies. The control module includes a multi-core system on chip architecture with a time triggered partition scheduler to coordinate functions among a plurality of modules. The control module controls brake steering and engine throttle to operate at a minimum.

FIG. 1 illustrates an example system 100 of an architecture for providing multi-function control in an automobile in accordance, according to some embodiments.

Referring now to the FIG. 1, a system on chip architecture 100 for providing multi-function control in an automobile is shown according to an embodiment of the subject technology. Embodiments of the subject technology provide architecture for implementing a dependable platform capable of supporting such applications mentioned above that would be implemented in future automobiles. Aspects of the subject technology provide the needed dependability, separation of concerns through robust partitioning and composability needed for future automobiles with drive-by-wire, autonomous driving or connected automobile capabilities.

The architecture includes a multicore system on chip (SoC) 102 with a three (3) level memory management unit (MMU) (or virtualization through a hypervisor 104), a supervisor and user and time-triggered communication peripherals for sensor communication (e.g. Flexray, TTCAN, TT (time triggered) Ethernet (TTE), etc.). The SoC 102 may be a multi-core chip (e.g. includes core's 106 A-H). In an exemplary embodiment, each module may have a dedicated core. Also, each module may provide a different category of functions than each other module. Some embodiments may include a synchronous media oriented interface (e.g. multi-core (MC) synchronization functionalities 108 A-E) like MOST for audio and video data that may be used to process signals for exteroceptive sensing purposes. A hypervisor layer of software is included (in for example, firmware) that abstracts and encapsulates the global timing control and scheduling at a global level for both the computer and communication resources via virtual CPUs 110 A-F communication of each core 106 A-H to each module function. The hypervisor may include a time-triggered scheduler (e.g. an ARINC 653, multicore synchronization, etc.) at a global level, and drivers handling the MAC-level scheduling for the buses and inter core (e.g. inter VM, etc.) communications using a deterministic protocol. The hypervisor control over timing aids in achieving timing coherence, composability and a separation of concerns. SoC 102 may include an Autosar stack architectural components 112 A-F to further abstract the hardware resources and create a componentized application development environment. A basic software layer, a runtime-environment (e.g. VFB, etc.) and an application layer are key layers in stack 112 A-F. Stack 112 A-F may also include a local scheduler for real-time multi-tasking at a local level.

A Virtual Function Bus (VFB) can be a logical entity that facilitates the concept of relocatability within the AUTOSAR software architecture by providing a virtual infrastructure that is independent from any actual underlying infrastructure and provides all services required for a virtual interaction between AUTOSAR components. It provides generic communication services that can be consumed by any existing AUTOSAR software component. These virtual services will then in a later development phase be mapped to actual implemented methods, that are specific for the underlying hardware infrastructure.

The function modules may include for example, include: a periodic proprioceptive sensing and fusion module 116; a periodic exteroreceptive sensing and fusion module 118; an advanced driver assistance (ADAS) control module 120; a periodic control module (not shown); a periodic throttle control module 122; a periodic brake control module 124; a periodic steering control module 126; a sporadic error sensing module 128; and an infotainment module 130.

Proprioceptive sensing and fusion module 116 may include sensing functions relevant to ADAS brake force and position sensing, throttle position, acceleration and speed sensing, and steering position and torque sensing. Proprioceptive sensing and fusion module 116 may use redundancy and diversity techniques to improve the reliability of the data and filtering and smoothing to remove measurement noise.

Exteroceptive sensing and fusion module 118 may include multi-modal sensing technologies (e.g. Lidar, multiple cameras, GPS (e.g. for location sensing), vehicle-to-vehicle communications, etc.). Exteroceptive sensing and fusion module 118 may use feature extraction, filtering, smoothing and fusion of data using algorithms such as, inter alia: KLT feature tracker, Kalman Filtering and Combining, etc. Some embodiments, may use a maximum-likelihood estimator and/or a support vector machine and/or an adaptive multimodal combining to arrive at a target controlled vehicle data (e.g. speed, acceleration, steering—yaw position) for the next period. This module may also have to interface with a bag of features which could be a local database or even updated by a cloud-based connection.

ADAS controller module 120 can receive the current vehicle data and target vehicle data for the next period and converts it into appropriate control information to be passed to the brake controller, steering controller and throttle controller.

A throttle and brake control algorithm may be configured to achieve a desired acceleration/deceleration profile. This can be implemented periodic throttle control module 122 and/or periodic brake control module 124. ADAS controller module 120 can be a centralized-control module that provides a direct user interface to engage or disengage the ADAS and/or the sporadic-error sensing module. ADAS controller module 120 can primarily controls all the control functions including the mentioned direct user interface to engage or disengage the ADAS and/or the sporadic-error sensing module.

Some embodiments may include personalized tuning. Personalization can be as follows. A user may want only the brake and throttle to be automated for a part of the journey while steering is still controlled by the driver. At other times may have all three functions automated. Additionally, the system can be tuned for high fuel efficiency or for high torque at low speeds to give a sporty ride in urban setting.

It is noted that, in some embodiments, brake, throttle and steering controllers may include a servo steering mechanism, a solenoid-valve-controlled electronic vacuum booster (EVB), and a step-motor controlled throttle. These modules will perform the translation necessary to send the desired commands to the intelligent motion control units. Sporadic error sensing module 128 may sense sporadic errors detected at different modules that could signal an unhealthy state that should disengage with the ADAS. Sporadic error sensing module 128 may use the Flexray dynamic portion to send and analyze health events. Sporadic error sensing module 128 may also work in tandem with a redundant system to detect any error conditions. Communication buses in the architecture may look for time triggered signals like Flexray, TTCAN, TTE, etc. Flexray can include dynamic support for event communication which may assist in helping to detecting sporadic errors.

Infotainment module 130 can provided infotainment. Infotainment module 130 can be implement using, for example, a Linux-based GPP and/or various infotainment systems (e.g. visual and/or audio displays, etc.).

Exemplary Methods

FIGS. 2 A-E illustrates several example processes 200-208 as implemented by architecture for providing multi-function control in an automobile in accordance, according to some embodiments. More specifically, FIG. 2A illustrates process 200. In process 200, periodic proprioceptive sensing and fusion module 116 can provide controlled vehicle data to periodic exteroceptive sensing and fusion module 118. FIG. 28 illustrates an example process 202. In process 202, periodic exteroceptive sensing and fusion 118 can provide target vehicle data to ADAS control module 120. FIG. 2C illustrates an example process 204. In process 204, ADAS control module 120 can provide desired throttle control parameters to periodic throttle control module 122.

In an electronic throttle control, the ECU controls the valve angle of the engine's butterfly valve that regulates the airflow. The pedal position sensor provides the reference position of the accelerator pedal and the throttle position sensor provides the current position of the butterfly valve which are sent to the ECU controller. The ECU controller implements a suitable control algorithm (for example a PID controller) to control the angle of the butterfly valve for the reference pedal position.

Figure 2A:
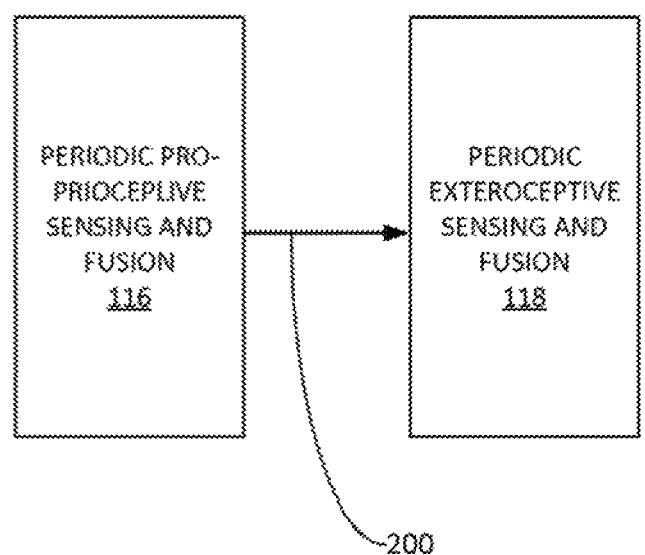
FIGS. 2 A-E illustrates several example processes as implemented by architecture for providing multi-function control in an automobile in accordance, according to some embodiments.
Figure 2B:
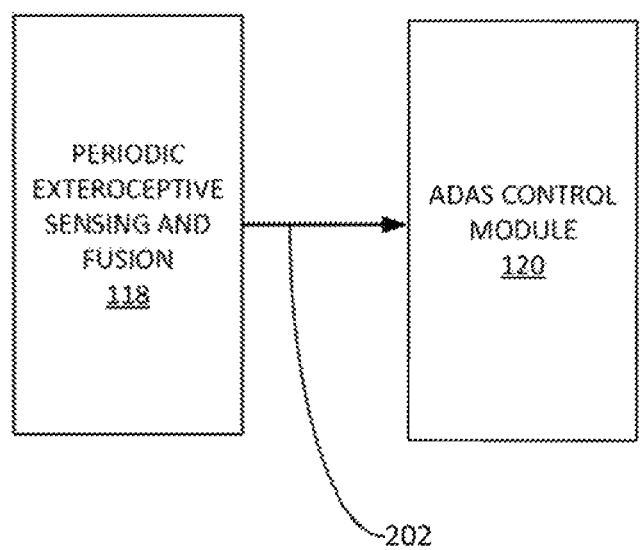
Figure 2C:
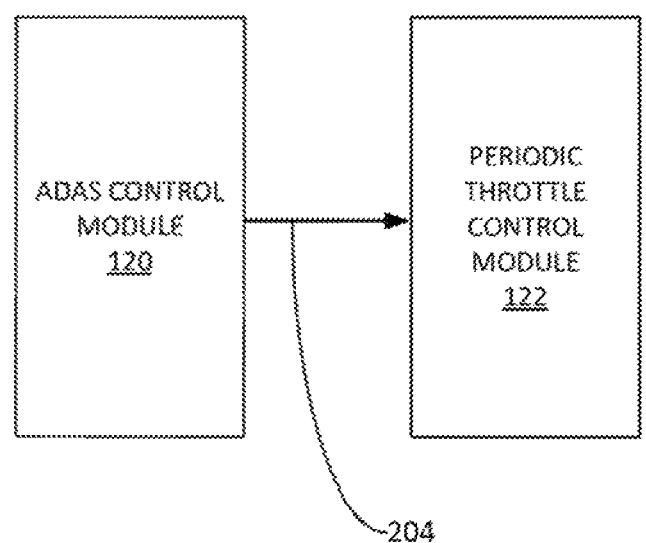
Figure 2D:
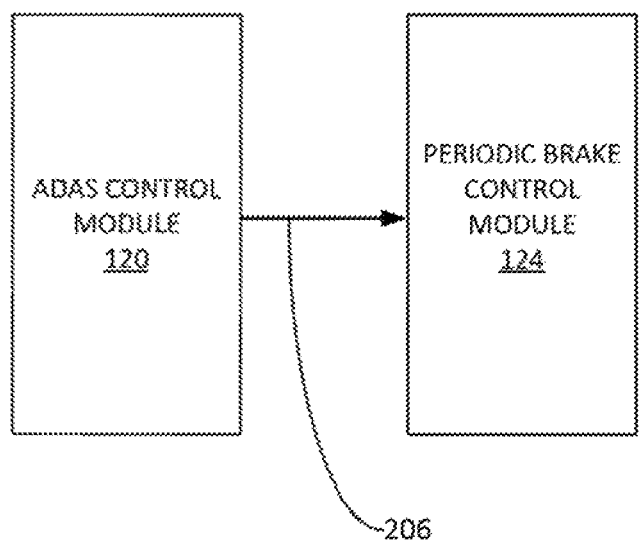
Figure 2E:
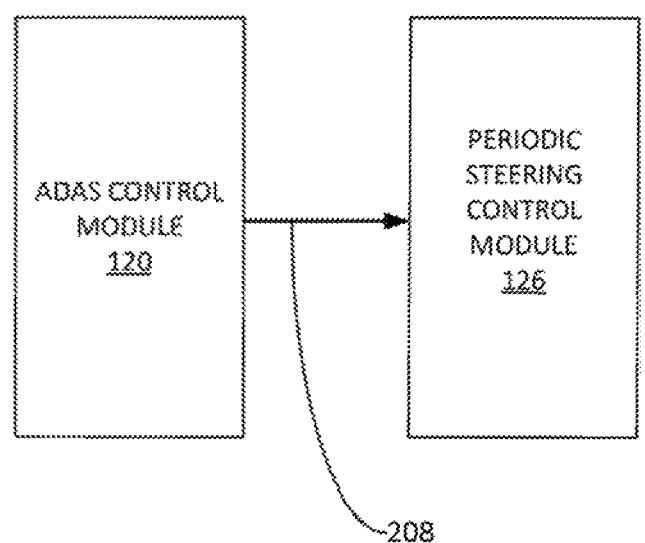

FIG. 2D illustrates an example process 206. In process 206, ADAS control module 120 can provide desired brake control parameters to periodic brake control module 124. FIG. 2E illustrates an example process 208. In an electro-mechanical braking (EMB) system the brake position sensor provides the reference brake position which is split up into 4 independent brake commands by the ECU based on high-level braking functions such as Anti-Lock Braking or Vehicle Stability Control. These command signals are sent to the four electric calipers (e-calipers) via a communication network. In each e-caliper a controller uses the brake command (received from ECU) as a reference input. In addition to tracking its reference brake command, the caliper controller also controls the position and speed of the brake actuator. The controller uses inputs from clamp force sensor, actuator position sensor, actuator speed sensor and internal temperature sensors while controlling the brake actuator.

In process 208, ADAS control module 120 can provide desired steering control parameters to periodic steering control module 126. It is noted that sporadic error sensing module 128 can send a disengage ADAS message to ADAS control module 120 when an error is sensed. In an Electric Power Steering (EPS), a torque sensor measures the reference torque on the steering column and sends a signal to the controller proportional to this torque. The torque information is processed In the controller and an assist command is generated. This assist command is further modulated by the vehicle speed signal, which is also received by the controller. This command is given to the motor, which provides the torque to the assist mechanism. The gear mechanism amplifies this torque, and ultimately the loop is closed by applying the assist torque to the steering column. So the main steering control parameters are the reference torque and the vehicle speed passed as input to the steering controller which generates the assist torque to the steering column.

FIG. 3 illustrates an example process 300 for algorithmically controlling automotive functions, according to some embodiments. Driver 302 can provide an engage ADAS to ADAS control module 304. ADAS control module 304 can send a startpropsense( ) signal to proprioceptive sensing module 306. ADAS control module 304 can send a startextsense( ) signal to exteroceptive sensing 308. ADAS control module 304 can send a startschedule( ) signal to ADAS control module 304. StartSchedule kicks off a time triggered scheduler to do periods processing with multicore synchronization at the beginning of every period to make sure all the cores run a synchronized schedule. This is important to make sure that all the different control tasks run on different cores are synchronized.

Periodically, process 300 can implement the following signals. Exteroceptive sensing 308 can send a sendextsensedata( ) message to ADAS control module 304. Sendextsensedata( ) send the collected exteroceptive sensor data—this depends on the exteroceptive sensor used, typically radar, camera, LIDAR etc., which provide the data to create a perception model.

ADAS control module 304 can send a processsensordata( ) to ADAS control module 304. ADAS control module 304 can send a sensebrakecontrol( ) message to brake control module 310. Processsensordata( ) processes the provided sensor data and performs fusion to create a perception model of the environment. This perception model is used in turn to create an optimal path which determines the target speed, acceleration and steering for the next period.

ADAS control module 304 can send a sensethrottleontrol( ) message to throttle control module 312. Finally, sporadic error sensing module 314 can send a disengageADAS( ) signal to ADAS control module 304.

Additional Exemplary Computer Architecture and Systems

Figure 4:
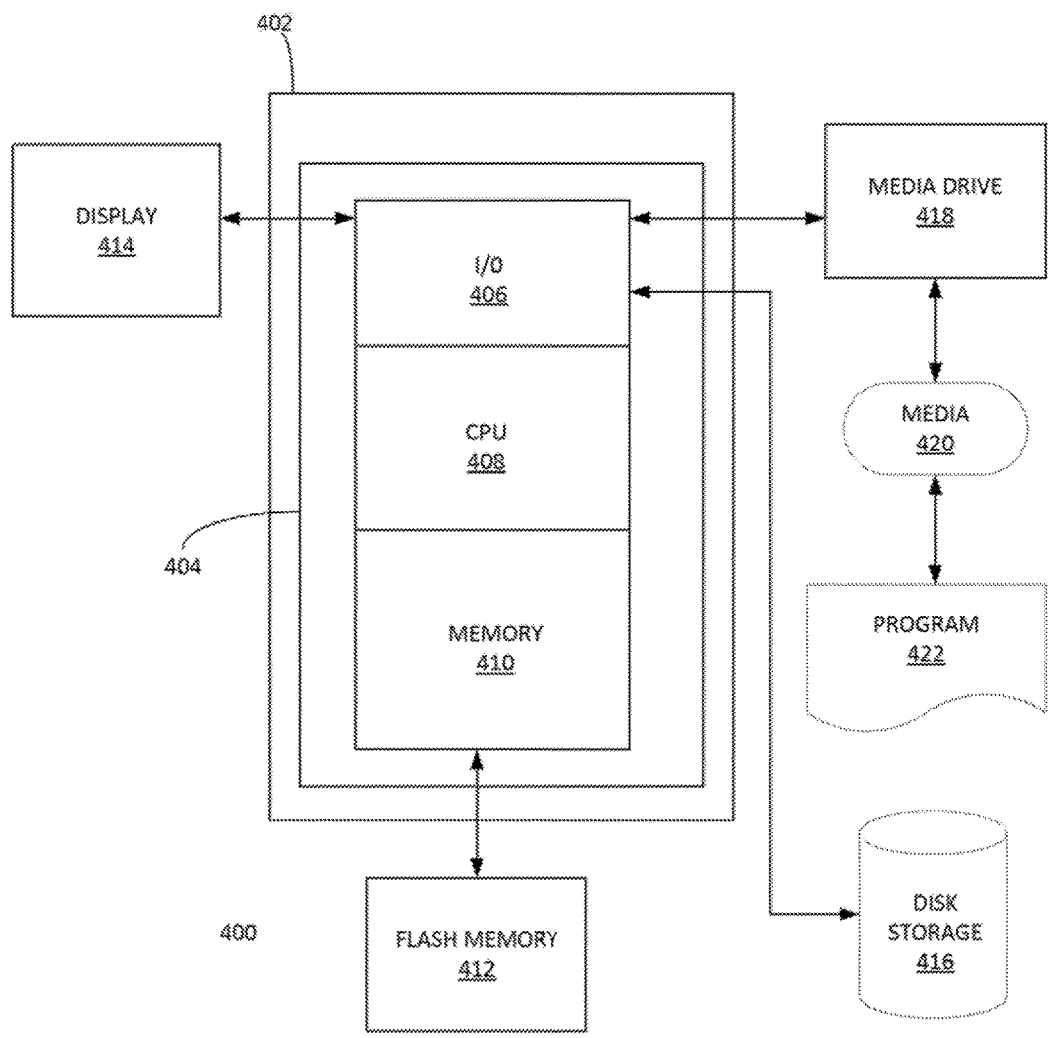
FIG. 4 depicts an exemplary computing system that can be configured to perform any one of the processes provided herein.

FIG. 4 depicts an exemplary computing system 400 that can be configured to perform any one of the processes provided herein. In this context, computing system 400 may include, for example, a processor, memory, storage, and I/O devices (e.g., monitor, keyboard, disk drive, Internet connection, etc.). However, computing system 400 may include circuitry or other specialized hardware for carrying out some or all aspects of the processes. In some operational settings, computing system 400 may be configured as a system that includes one or more units, each of which is configured to carry out some aspects of the processes either in software, hardware, or some combination thereof.

FIG. 4 depicts computing system 400 with a number of components that may be used to perform any of the processes described herein. The main system 402 includes a motherboard 404 having an I/O section 406, one or more central processing units (CPU) 408, and a memory section 410, which may have a flash memory card 412 related to it. The I/O section 406 can be connected to a display 414, a keyboard and/or other user input (not shown), a disk storage unit 416, and a media drive unit 418. The media drive unit 418 can read/write a computer-readable medium 420, which can contain programs 422 and/or data. Computing system 400 can include a web browser. Moreover, it is noted that computing system 400 can be configured to include additional systems in order to fulfill various functionalities. Computing system 400 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 5:
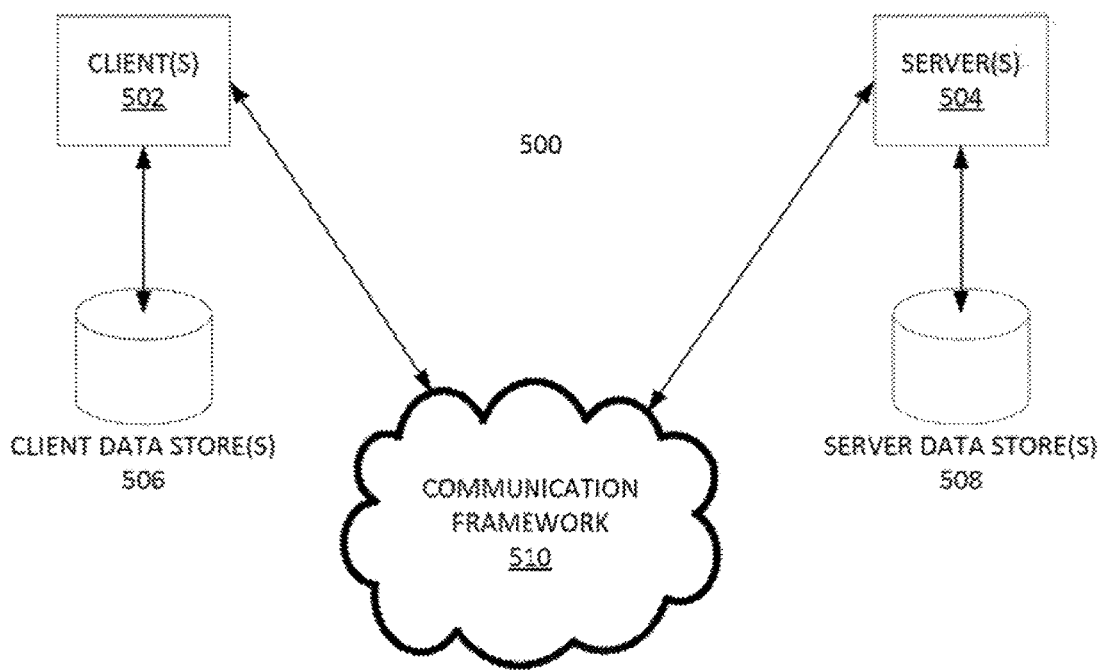
FIG. 5 is a block diagram of a sample computing environment that can be utilized to implement various embodiments.

FIG. 5 is a block diagram of a sample computing environment 500 that can be utilized to implement various embodiments. The system 500 further illustrates a system that includes one or more client(s) 502. The client(s) 502 can be hardware and/or software (e.g., threads, processes, computing devices). The system 500 also includes one or more server(s) 504. The server(s) 504 can also be hardware and/or software (e.g., threads, processes, computing devices). One possible communication between a client 502 and a server 504 may be in the form of a data packet adapted to be transmitted between two or more computer processes. The system 500 includes a communication framework 510 that can be employed to facilitate communications between the client(s) 502 and the server(s) 504. The client(s) 502 are connected to one or more client data store(s) 506 that can be employed to store information local to the client(s) 502. Similarly, the server(s) 504 are connected to one or more server data store(s) 508 that can be employed to store information local to the server(s) 504. In some embodiments, system 500 can instead be a collection of remote computing services constituting a cloud-computing platform.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized system for controlling automotive functions of a vehicle, comprising:
   a multi-core system on chip;
   a hypervisor including a multi-core synchronization function for a plurality of cores on the system on chip, wherein the hypervisor comprises a time-triggered scheduler to implement periods processing with a multicore synchronization protocol at the beginning of every period to ensure that the cores run a synchronized schedule such that different control tasks run on different cores are synchronized, and wherein each module has a dedicated core;
a plurality of automotive function modules in communication with the plurality of cores through the hypervisor;
wherein the plurality of automotive function modules comprises:
   a proprioceptive sensing and fusion module that comprises a brake force sensor system, an actuator position sensor system, a throttle position sensor system, an acceleration sensor system, a speed sensing system, and a steering position sensing system and a torque sensing system to sense a current vehicle data, and wherein the proprioceptive sensing and fusion module provides the current vehicle data to the advanced driver assistance (ADAS) control module;
   an exteroreceptive sensing and fusion module comprising a radar system, a vehicle-to-vehicle communications system, wherein the exteroreceptive sensing and fusion module calculates a target vehicle data with the multi-modal sensing system, and wherein the exteroreceptive sensing and fusion module provides the target vehicle data to the ADAS control module;
   the ADAS control module to receive the current vehicle data from the proprioceptive sensing and fusion module and the target vehicle data from the exteroreceptive sensing and fusion module, and to convert the target vehicle data and the current vehicle data into a target controlled vehicle data to a periodic brake control module, a periodic steering control module and a periodic throttle control module, wherein the ADAS control module uses feature extraction algorithms, filtering processes, and fusion of data algorithms to calculate the target controlled vehicle data, wherein the target controlled vehicle data comprises a speed value of the vehicle for a next specified period, an acceleration value of the vehicle for a next specified period, and a yaw position of the vehicle for a next specified period;
   wherein the periodic throttle control module controls a throttle behavior of the vehicle based on the acceleration value of the vehicle for the next specified period,
   wherein the periodic steering control module controls a steering behavior of the vehicle based on the yaw position of the vehicle for the next specified period, and
   wherein the periodic braking control module controls a braking behavior of the vehicle based on the speed value of the vehicle for the next specified period.

2. The computerized system of claim 1, wherein the plurality of automotive function modules comprises:
   an infotainment module to manage an infotainment system of the vehicle.

* * * * *